Sept. 29, 1953  K. A. KARLSSON  2,653,520
PULP TREATING APPARATUS
Filed April 22, 1948  2 Sheets-Sheet 1
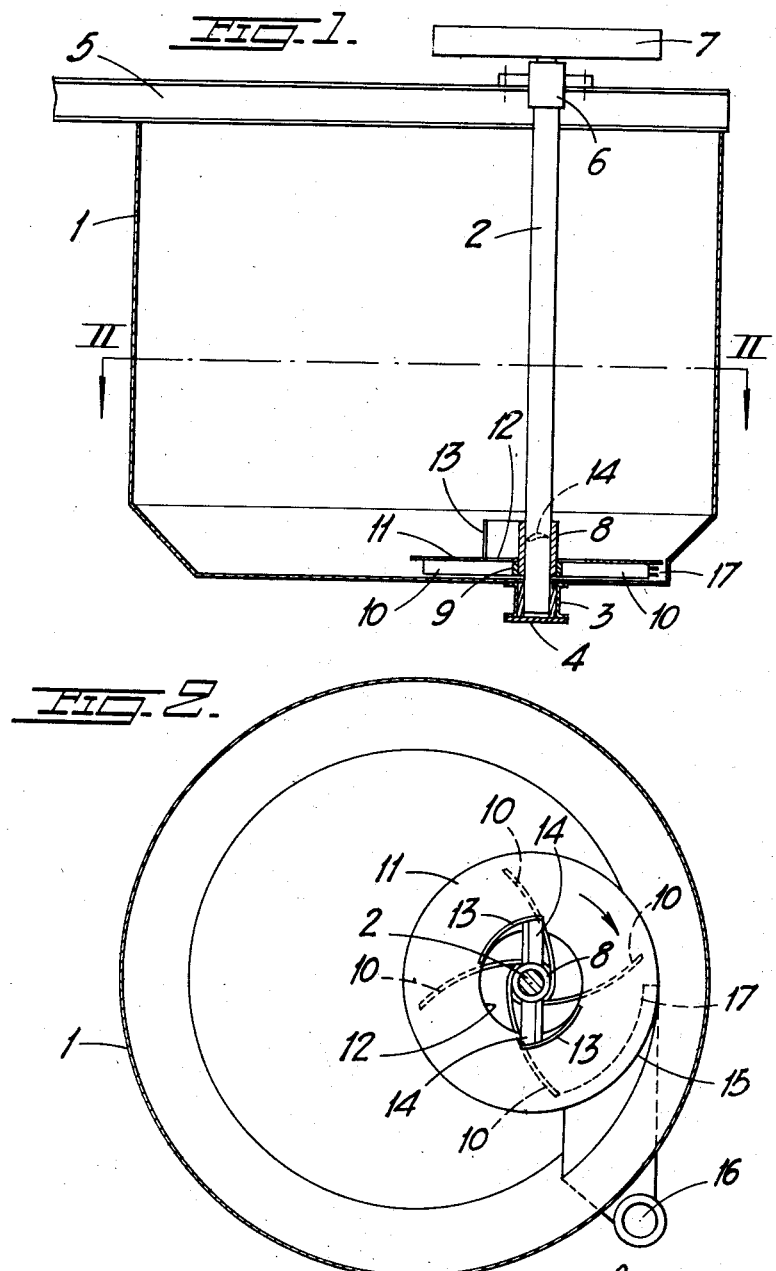
Inventor
Karl Arvid Karlsson
by Sommers & Young
Attorneys

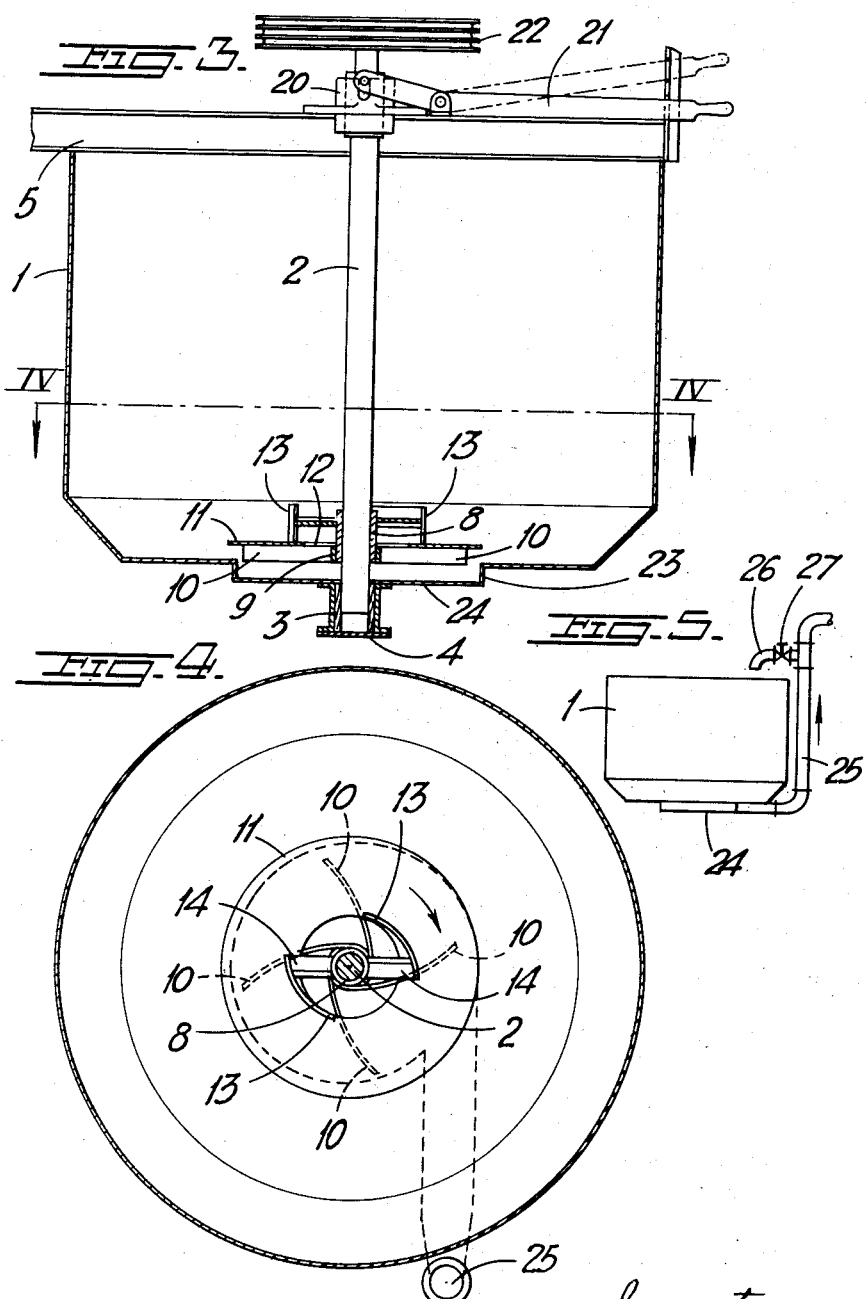

Patented Sept. 29, 1953

2,653,520

UNITED STATES PATENT OFFICE 2,653,520

PULP TREATING APPARATUS

Karl Arvid Karlsson, Stockholm, Sweden

Application April 22, 1948, Serial No. 22,652
In Sweden December 8, 1947

5 Claims. (Cl. 92—26)

The raw material most frequently used for the manufacture of paper in paper mills is paper pulp. Another raw material used for the same purpose, though not in the same extent, is waste paper obtained from paper mills. The paper pulp is generally delivered to the paper mill in the form of bales containing, as a rule, not more than 10% water, and before this dry paper pulp may be treated in a pulping engine it must be mixed with water to form a suspension containing about 4 to 8% paper pulp. The same treatment is applied to the waste paper. Up to the present time it is usual practice to use the pulping engine also for preparing the suspension of paper pulp or waste paper in water. Since, however, the pulping engines, as a matter of fact, are grinding tools, they may only operate at a very low efficiency when used for such operation, thereby considerably reducing the capacity of the pulping machinery as a whole.

Proposals made in order to overcome said inconveniences have not given satisfactory results. One such proposal provides the use of separate apparatus for mixing the paper pulp or the waste paper with water and agitating the mixture for obtaining a suspension suitable for further treatment in a pulping engine. The hitherto known apparatus of this kind, however, have proved unsatisfactory in several respects. Above all, the consumption of power has proved too high with relation to the capacity of the apparatus.

The object of the present invention is to provide an improved apparatus for treating a mixture of paper pulp or waste paper and water in order to prepare a suspension of a proper consistency for allowing its further treatment in a pulping engine in an economic manner. Another object of the invention is to provide such an apparatus which operates at a high efficiency and is constructed with a view to rendering it capable of operating as a centrifugal pump too, thereby rendering the apparatus self-emptying.

The apparatus according to the invention comprises a tank or other receptacle, preferably a cylindrical receptacle of sheet metal, at or near the bottom of which is mounted a blade wheel on a vertical shaft, said blade wheel carrying by the top edges of its blades a disc which extends to, or beyond, the outer ends of the blades, said disc being formed with a central opening forming an inlet through which the contents of the tank may be drawn into the centre of the blade wheel to be then forced outwards by the action of the blades. By this means a positive circulation of the contents of the tank is obtained causing the contents to flow from the blade wheel along the bottom of the tank towards the side wall thereof, upwards along said side wall and then again inwards and downwards to be drawn in through the pump inlet and then again recirculated through the tank.

The shaft of the blade wheel generally extends vertically upwards through the tank and is driven by power transmitted to its upper end, as for instance, by a rope drive, a belt drive or another transmission from a source of power. As an alternative the shaft may, of course, have a power motor of its own directly connected or coupled thereto. It is to be noted, however, that the shaft need not necessarily extend upwards through the tank, but may, if desired, extend downwards through the bottom thereof and receive driving power at its lower end. In this case the interior of the tank becomes quite free from moving elements except the blade wheel proper.

The blade wheel is, preferably, provided with appropriate means, such as, for instance, curved baffles or shields formed as knife blades for tearing off pieces from the bales of paper pulp or tearing the waste paper in pieces, as the case may be. Said baffles or shields may be carried by arms which may be shaped as knife blades too. For instance, said arms may form radial knives. In addition, said arms may be shaped as propeller blades in order to effect a movement of the liquid along the shaft.

The blade wheel may also act as a pump wheel for emptying the tank. To this end it may either be permanently connected to an outlet opening formed in the circumferential wall of the tank or it may be temporarily connected to such an outlet. In both cases the end walls of the pump casing are formed, on the one side, by the said disc forming the top wall of the blade wheel and, on the other side, by the bottom of the tank. In the said first-mentioned case a portion of the contents of the tank is permanently pumped out; in the said last-mentioned case the emptying of the tank takes place at intervals.

In the accompanying drawings both of these embodiments of the apparatus are illustrated. Fig. 1 is a vertical section and Fig. 2 is a horizontal section on the line II—II of Fig. 1 showing one embodiment. Fig. 3 is a vertical section and Fig. 4 is a horizontal section on the line IV—IV in Fig. 3 showing the other embodiment. Fig. 5 is a substantially diagrammatic side elevation of a tank of modified design.

With reference to Figs. 1 and 2, the numeral 1 designates a substantially cylindrical tank or receptacle open at its top. Mounted eccentrically in said tank is a vertical shaft 2 which extends along the entire height of the tank and projects by its lower end through a hole formed in the bottom of the tank. The projecting lower end of the shaft is mounted in a bushing 3 preferably provided with a lining of a hard wood or the like, said bushing being also preferably formed with a removable bottom member 4 in order to facilitate a replacing of the lining. Above the tank the shaft 2 is mounted in a bearing 6 supported by a beam 5 extending across the top of the tank. The upper end of the shaft projecting above said bearing may carry a belt pulley 7, as shown, or another element for transmitting power to the shaft or, as already stated, the shaft may be coupled to a motor.

Provided in the tank at a short distance above the bottom is a blade wheel carried by the shaft 2, which comprises a sleeve 8 keyed to the shaft, a hub 9 surrounding said sleeve and connected thereto by appropriate means, a number of blades 10 carried by said hub, and an annular disc 11 supported by the upper edges of the blades which is formed with a central opening 12 concentrically surrounding the sleeve 8. Said disc 11 supports two baffles or shields 13 curved eccentrically with relation to the sleeve 8 which are connected to said sleeve at their one ends by means of preferably radial arms 14, as shown in Fig. 2. Said baffles or shields and said arms may, preferably, be so constructed and arranged as to act as tearing elements and, furthermore, the arms may be obliquely placed, as indicated in Fig. 1, so as to act as propeller blades for improving the movement of the liquid in the direction of shaft 2.

At that point of the circumferential wall of the tank where the blade wheel is next to said wall, an outlet opening 15 is formed in said wall which is at the same level as the blades of the blade wheel. Extending from said opening is a discharge conduit 16. Said outlet opening is provided with a grid 17 formed by ribs or other suitable elements for a purpose hereinafter stated. The operation is as follows:

The tank being filled with water up to a desired level, the blade wheel starts rotating, whereupon the bales of paper pulp or the waste paper to be used as raw material for paper production is filled into the tank. Since the blade wheel is constructed substantially as a centrifugal pump wheel, the water together with the paper pulp or waste paper contained therein is drawn by the pumping action of the blade wheel toward the opening 12 in the middle of the disc 11 and reaches through said opening the blades to be then forced out at a high velocity toward the peripheral wall of the tank. During the rotation of the blade wheel pieces or bits of the paper pulp are torn off from the bales, or the waste paper is torn into pieces by the action of the baffles or shields 13 and arms 14. Larger pieces not sufficiently disintegrated and suspended in the water are prevented from reaching the opening 12 by the action of the shields 13 and the arms 14, and such pieces are caused to recirculate in the tank so as to again and again approach the shields and arms, until they are disintegrated sufficiently for passing through the opening 12. By the action of the blade wheel the contents of the tank are caused to recirculate, as already described, resulting in a more and more intimate mixing of the pulp or paper particles with the water.

In rotation, the blade wheel also acts as a pump wheel, effecting a continuous flow of water under a certain pressure above atmospheric through the outlet conduit 16 which may be in direct or indirect communication with the pulping engine. According as the emptying by the action of the blade wheel proceeds, the quantity of water and pulp or paper is replaced by supplying more water and pulp or paper into the tank. By the provision of the grid 17 in the outlet 15 no big pieces of pulp or paper are allowed to enter the conduit 16. Such pieces are returned to the tank and recirculated similarly as above described in respect of the pieces held back from the opening 12.

In the embodiment shown in Figs. 3 and 4 a blade wheel is carried by a central shaft 2 in the cylindrical tank 1. Said blade wheel may be of a design similar to that already described so that it is not necessary again to describe it. In this case the central shaft 2 is slidably mounted in a bearing 3 below the bottom of the tank, as well as in a bearing 20 supported by the beam 5 at the top of the tank. By means of a lever 21 the shaft may be reciprocated axially within certain limits. Supported at the upper end of the shaft, above the bearing 20, is a rope pulley 22. As already hereinbefore stated, the transmission of power to the shaft may also be effected by other appropriate means, as by a motor coupled to the shaft.

The displacement of the shaft of this embodiment is required because the circumferential wall of the tank cannot act as a portion of a pump casing for the blade wheel, when the latter is positioned centrally in the tank. In order to obtain a pump casing the bottom of the tank is formed with a depressed portion comprising a cylindrical wall member 23 and a circular bottom member 24 the diameter of which is approximately equal to that of the disc 11 supported by the upper edges of the blades.

In order that said depressed portion may be capable of acting as a pump casing, whenever required, it is necessary that the blade wheel is lowered thereinto, which may be effected by lowering the shaft 2. In the lowered state of the blade wheel there is thus formed a pump casing, in part, by the disc 11 and, in part, by the depressed portion 23, 24 of the tank bottom. The cylindrical wall member 23 of said depressed portion is provided with a tangential outlet leading to a discharge conduit 25 which may be directly or indirectly connected to the pulping engine.

The operation of this apparatus is intermittent. During the mixing and agitating stage the blade wheel is in its raised position, shown in Fig. 3, in which it is situated above the level of the depressed portion 23, 24 with the lower edges of the blades substantially in flush with the bottom of the tank surrounding the depressed portion 23, 24. In this case the raw material, as paper pulp or waste paper, and water are filled into the tank at intervals, a quantity of pulp or paper and water as is required for a charge being filled into the tank at each time. The water with the pulp or paper therein is caused to circulate by the action of the blade wheel in the above described way until the pulp or paper is sufficiently suspended in the water. Then the blade wheel is lowered into the depressed portion 23, 24 in order to act as a pump wheel for forcing the contents of the tank out into the discharge pipe 25. The preparation of the suspension being finished and the tank emptied, the blade wheel is again raised into its normal position and the tank supplied with another charge of water and pulp or waste paper.

It is to be noted that the invention is not restricted to the embodiments above described, inasmuch as modifications in several respects may be made without departing from the principle of the invention. For instance, it may be desirable to cause a portion of the suspension discharged into the conduit 16 or 25 to recirculate in the tank. In such case the discharge conduit 16 or 25 may be provided with a branch pipe leading back to the tank, as shown at 26 in Fig. 5 in respect of the discharge pipe 25. Said branch pipe 26 is provided with a valve 27 to control the amount of suspension to be recirculated.

What I claim is:

1. In an apparatus for treating a mixture of water and solid material to be used as a raw material for paper manufacture in order to prepare a suspension suitable for further treatment in a pulping engine, the combination of a tank for receiving said water and solid material, a blade wheel mounted at a short distance from the bottom of said tank for circulating the contents thereof, a vertical shaft rotatably mounted in said tank for carrying said blade wheel, means for imparting a rotary motion to said shaft, a disc-shaped wall supported by said blade wheel so as to form a top wall therefor, said wall having a central opening leading to the inner ends of the blades, and an outlet leading from the tank in a tangential direction, the blade wheel being adapted to act as a pump for expelling the contents of the tank through said outlet.

2. In an apparatus of the class described, a tank comprising a cylindrical side wall and a bottom, said bottom having a centrally positioned depressed portion, a blade wheel mounted adjacent the bottom of the tank above the depressed portion thereof for circulating the contents of the tank, a vertical shaft rotatably and slidably mounted in the middle of the tank for carrying the blade wheel, means to impart a rotary movement to said shaft, a disc-shaped top wall for the blade wheel having a central inlet opening for allowing the contents of the tank to reach the inner ends of the blades of the blade wheel, a tangential outlet leading from said depressed portion of the tank bottom, a discharge pipe connected to said tangential outlet, and means for axially displacing the blade wheel shaft for lowering it into the depressed portion of the tank bottom, the blade wheel being adapted to act as a pump wheel for expelling the contents of the tank through said tangential outlet.

3. In an apparatus of the class described, a tank for receiving a watery suspension of the material to be treated, a blade wheel located near the bottom of the tank for agitating the contents of the tank, a vertical shaft for supporting and locating said blade wheel, a disc provided on the blade wheel for constituting a top wall thereof, said disc having a central opening for allowing the contents of the tank to reach the inner ends of the blades of the blade wheel, means on said disc for preventing coarse material from passing through said central opening, arms for connecting said means with the vertical shaft of the blade wheel, said means and said arms being formed as knife edges for cutting coarse solid material of the suspension to pieces, an outlet port formed in the tank, and a discharge pipe connected to said port and leading therefrom in a tangential direction with respect to the blade wheel, the blade wheel being adapted to act as a centrifugal pump wheel for discharging the treated contents of the tank through said outlet port and associated discharge pipe.

4. In an apparatus of the class described a tank for receiving a watery suspension of the material to be treated, the bottom of said tank having a centrally positioned depressed portion, a blade wheel mounted above said depressed portion for agitating the contents of the tank, a vertical shaft for supporting said blade wheel, said shaft being axially displaceable so as to allow lowering of the blade wheel into said depressed bottom portion, said blade wheel comprising in addition to the blades a hub and an annular disc provided on the top edges of the blades so as to form a top wall having a central inlet opening for allowing the contents of the tank to reach the inner ends of the blades of the blade wheel, said disc-shaped top wall being further so arranged as to form in the lowered position of the blade wheel the top wall of a pump casing the bottom and side wall of which are formed by the depressed portion of the bottom of the tank, means for effecting the axial displacement of the blade wheels, and a tangential outlet leading from the depressed portion of the tank bottom, the blade wheel, when in its lowered position, being adapted to act as a centrifugal pump wheel for emptying the tank.

5. In an apparatus as claimed in claim 4, the further feature that the blade wheel also comprises a set of upstanding curved shields supported by the annular top wall of the blade wheel which are eccentric with relation to the axis of the blade wheel shaft and a corresponding set of radial horizontal knives inserted between the hub of the blade wheel and said curved shields so as to cut in a plane at right angles to the axis of the blade wheel.

KARL ARVID KARLSSON.

References Cited in the file of this patent

UNITED STATES PATENTS

| Number | Name | Date |
| --- | --- | --- |
| Re. 1,108 | Sweetland | Jan. 1, 1861 |
| 144,313 | Bridge | Nov. 4, 1873 |
| 357,686 | Nacke | Feb. 15, 1887 |
| 473,530 | Smith | Apr. 26, 1892 |
| 1,002,698 | Jonassen et al. | Sept. 5, 1911 |
| 1,354,489 | Johnson | Oct. 5, 1920 |
| 1,431,422 | Randecker | Oct. 10, 1922 |
| 1,762,950 | Beers | June 10, 1930 |
| 1,835,984 | Haskell | Dec. 8, 1931 |
| 1,951,684 | Wells | Mar. 20, 1934 |
| 2,016,647 | McMartin | Oct. 8, 1935 |
| 2,129,789 | Seaborne | Sept. 13, 1938 |
| 2,371,837 | Martindale | Mar. 20, 1945 |
| 2,485,368 | Dodge | Oct. 18, 1949 |

FOREIGN PATENTS

| Number | Country | Date |
| --- | --- | --- |
| 596,155 | Germany | Apr. 27, 1934 |